United States Patent Office 3,261,121
Patented July 19, 1966

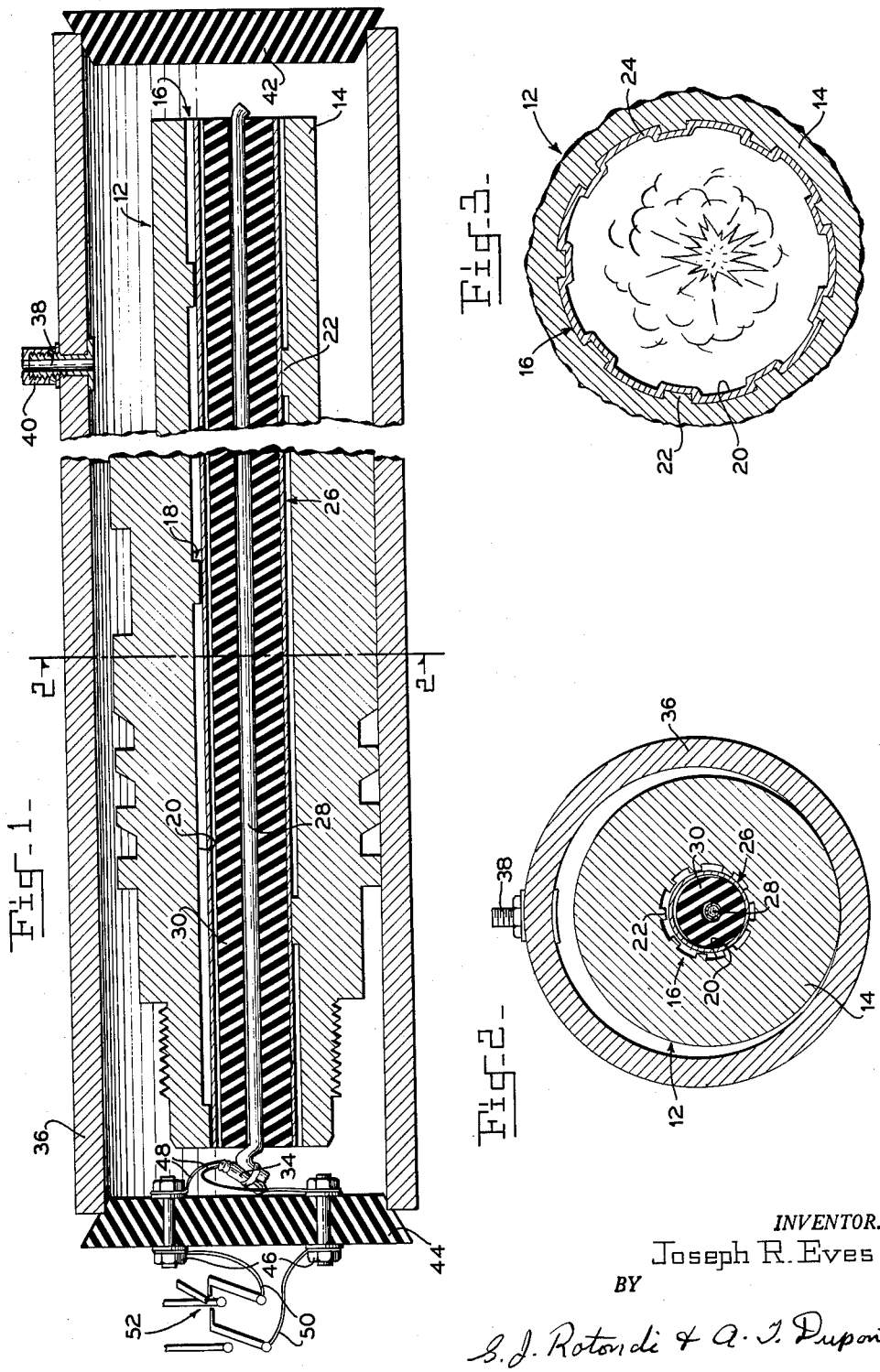

3,261,121
GUN BARREL WITH EXPLOSIVELY WELDED LINER
Joseph R. Eves, Springfield, Mass., assignor to the United States of America as represented by the Secretary of the Army
Filed Oct. 13, 1961, Ser. No. 145,006
7 Claims. (Cl. 42—78)

The invention described herein may be manufactured and used by or for the Government for governmental purposes without the payment to me of any royalty thereon.

This invention relates to gun barrels in which the rifled bore is protected by a cladding of dissimilar metals and to methods for applying protective cladding to gun barrel bores.

One of the major problems encountered in modern ordnance guns which fire high powered ammunition at very rapid rates has to do with the damage caused by wear and heat to the rifling. The damaging action takes place so rapidly that, if the rifling is formed directly in the steel barrel and is unprotected, the barrel has an effective life of only a few seconds of continuous fire.

In the past, the means for overcoming the problem has been to insert into the barrel a rifled liner fabricated from a dissimilar metal having greater strength at high temperatures than steel or to plate the rifled bore with chromium.

Neither of these means, however, has been entirely satisfactory. When an insert is used, it is generally retained in the barrel by friction but this is not sufficient to secure the liner in the barrel and is displaced by discharge forces. Chromium, during the electroplating process, loses its ductility so that it becomes chipped by the impact of the projectile thereagainst, whereby the rifling is mutilated and the uncovered metal is subjected to erosion. Moreover, chromium plate is porous, permitting action of discharge gases against the steel of the barrel underneath.

Both of these means, too, require considerable and expensive equipment and skilled operators and under the productive methods of manufacture it is difficult, even at best, to obtain uniform results.

It is, therefore, one object of this invention to provide a gun barrel in which the rifled bore is protected against damage by heat and wear by a cladding composed of an alloy of refractory metallic elements which have melting points higher than that of chromium and which retain their strength at high temperatures.

It is another object of this invention to protect the rifled bores of gun barrels with a cladding which remains ductile after being bonded thereto.

It is a further object of this invention to clad the rifled bores of gun barrels with a high density metal to insulate the metal of the barrel tube from the discharge gases formed in the bore.

It is still another object of this invention to provide a method of bonding such a cladding to rifled bores of gun barrels without complex and expensive equipment and skilled operators.

It is a still further object of this invention to provide a method of bonding such a cladding to rifled bores of gun barrels by welding.

It is another and still further object of this invention to provide such a method whereby such a cladding of refractory metal can be applied to barrel tubes fabricated from such lightweight metals as aluminum and titanium or from other noncritical metals.

It is still another and further object of this invention to provide such a method whereby the cladding remains ductile after being bonded to the barrel tube.

It is a still further object of this invention to apply the cladding to the pre-rifled barrel bore by inserting the cladding in tubular form thereinto and then initiating a detonating charge inside the tube so that the shock waves press the cladding into welding relationship with the bore and assume the shape of the rifling therein.

The specific nature of the invention as well as other objects and advantages thereof will clearly appear from a description of a preferred embodiment as shown in the accompanying drawings in which:

FIG. 1 is a longitudinally cross-section view of a barrel case with the cladding in tubular form positioned therein and the equipment for explosively forming the cladding to the shape of the rifled bore of the barrel case and simultaneously welding the shaped cladding thereto ready for discharge;

FIG. 2 is a section taken along line 2—2 of FIG. 1; and

FIG. 3 is an enlarged view similar to FIG. 2 but showing the barrel case after the detonator with the tubular cladding has been initiated.

Shown in the figures is a gun barrel 12 which includes a casing 14 fabricated from steel or from such light metals as aluminum and titanium. Casing 14 is provided with an axial bore 16 which is rifled, as noted at 18, to form spiral grooves 20 and lands 22. Rifling 18 is protected against damage by wear and heat through the use of a cladding 24 of refractory metal which is bonded to the surface of bore 16 by welding. Cladding may be formed from alloys made up of combinations of such elements as columbium, tantalum, zirconium, beryllium, and tungsten which have melting points higher than that of chromium and which retain their strength at high temperatures. These are also high density metals which provide an impregnable barrier between the wall of bore 16 and the discharge gases formed therein. An alloy composed of 66% columbium, 33% tantalum and 1% zirconium has proven to be very effective for cladding 24.

These refractory metals have not been used previously for barrel bore cladding because their usefulness has only recently been realized and because they cannot be worked by conventional means. However, by the method to be described hereinafter, it is now possible to clad the bore of gun barrels with refractory metal by the explosive forming process and thereby produce a better barrel more quickly and more easily than has been possible before.

The first steps in this method are to drill bore 16 in casing 14 and then form rifling 18 therein. Barrel 12 is for a 20 mm. machine gun so that the diameter of bore 16 between lands 22 is to be .787–.789 inch after cladding 24 is bonded thereon. Therefore, bore 16 is drilled to a diameter of .799–.801 inch to compensate for cladding 24 which is .006 inch thick. Next, cladding 24, formed as tube 26, is inserted into bore 16. Tube 26 has a wall thickness of .007 inch because, when it is stretched into grooves 20 during the forming step, it is thinned down to .006 inch. Tube 26 extends the full length of bore 16 and has an outside diameter essentially similar to that thereof so as to be easily positioned in the rifled bore but without a sloppy fit.

Next, a detonator cord 28 is inserted into a tubular sheath 30 which is composed of a resilient composition having the characteristics of rubber and which has an outside diameter slightly smaller than the inside diameter of tube 26 so that the sheath may be inserted thereinto. The length of sheath 30 is approximately the same as that of bore 16 and detonator cord 28 is slightly longer so that one end may extend from casing 14 for connection to an electrical detonator 34.

Detonator cords are available with different types of detonating material therein and of different power. Detonator cord 28 is filled with PETN, 150 grains per foot, which has proven to be effective in explosively forming tube 26 to bore 16 to form cladding 24 and welding the cladding thereto.

Next, casing 14 is placed inside a cylindrical chamber 36 which is open at both ends and is provided with an outlet 38 connectable by pipe means 40 to a vacuum pump (not shown) for evacuating the air from the chamber and, therefore, from between tube 26 and bore 16 so not to interfere with the forming and welding of cladding 24. A stopper 42 is pressed air tight into the end of chamber 34 opposite that at which electrical detonator 34 is located. Another stopper 44 is provided with a pair of spaced electrical terminals 46 which extend therethrough. Leads 48 of electrical detonator 34 are respectively connected to the inside ends of terminals 46 and then stopper 44 is pressed air tight into the adjacent end of chamber 36. The outside ends of terminals 46 are connected by wire means 50 to a source of electrical energy (not shown). A switch 52 interrupts wire means 50 for controllably completing the electrical circuit between the source of electrical energy (not shown) and electrical detonator 34.

Finally, the air inside of chamber 36 is evacuated to remove the air from between tube 26 and bore 16 and then switch 52 is closed to discharge electrical detonator 34 which initiates detonator cord 28.

The shock waves produced by the initiation of detonator cord 28 travel outwardly therefrom to sheath 30 at a velocity of approximately 25,000 feet per second. The shock waves pass through sheath 30 at a slightly reduced velocity and are transmitted thereby to tube 26 which, though the action of the shock waves lasts only a matter of milliseconds, passes through the elastic to the plastic stage and takes permanent set in welded engagement with bore 16 without spring back. The strength of the weld is largely dependent upon the strength of the detonating material used in detonator cord 30. With tube 26 being formed to the contours of rifling 18 in a plastic state, the edges of lands 22 provide no difficulty as the metal of the tube under this method of forming can be given sharp changes in direction without cracking.

Sheath 30 is used because shock waves are quickly dissipated in air but are carried by the sheath, which acts as a transmitting medium, to tube 26 and, while the sheath reduces the peak pressure of the shock waves, it also serves to round them off and prolong the action so that the forces are distributed more evenly to the tube and damage by rapid impact and decline of pressure is eliminated. Sheath 30, by action of the shock wave forces, is entirely disintegrated and stoppers 42 and 44 are blown from the ends of chamber 34. Barrel 12 is now completely fabricated with cladding 24 fixedly bonded by welding to bore 16 and no more machining is required. All that remains to be done is to remove barrel 12 from chamber 34 and clean and inspect bore 16.

From the foregoing, it is clearly apparent that barrel 12 by the method of fabrication recited herein provides a great advancement in the art as bore 16 is clad with a refractory metal which has a melting point higher than chromium and which retains its strength at high temperatures. Moreover, cladding 24 remains ductile after being bonded to bore 16 and the method of bonding, by welding, provides a new and superior way of securing a cladding of dissimilar metal to a barrel bore. In addition, the method of fabricating barrel 12 is distinguished for its simplicity and the minimum of equipment required and for the ease with which refractory metals, which cannot be worked by any conventional means, can be easily molded to the pre-rifled contours of a barrel bore.

Although a particular embodiment of the invention has been described in detail herein, it is evident that many variations may be devised within the spirit and scope thereof and the following claims are intended to include such variations.

I claim:

1. A gun barrel comprising a casing provided with an axial bore, grooved rifling formed in said bore, and a protective cladding for said bore consisting of a tube explosively welded to said casing into conformation with said bore along the entire interfaces of said tube and bore, the interior surface of said cladding having the configuration of said rifling.

2. The gun barrel as defined in claim 1 wherein said cladding is of a material dissimilar to that from which said casing is fabricated.

3. The gun barrel as defined in claim 1 wherein said cladding is of a refractory metal.

4. The gun barrel as defined in claim 1 wherein said cladding is of a refractory metal having a melting point higher than that of chromium.

5. The gun barrel as defined in claim 1 wherein said casing is fabricated from aluminum and said cladding is of a refractory metal.

6. The gun barrel as defined in claim 1 wherein said casing is fabricated from titanium and said cladding is of a refractory metal.

7. The gun barrel as defined in claim 1 wherein said cladding is of an alloy principally of columbium and tantalum.

References Cited by the Examiner

UNITED STATES PATENTS

| | | | |
|---|---|---|---|
| 1,742,417 | 1/1930 | Schrobsdorff | 42—76 |
| 2,038,304 | 4/1936 | Middler | 113—44 |
| 2,373,405 | 4/1945 | Lowit | 42—76 |
| 2,687,591 | 8/1954 | Lamb et al. | 42—76 |
| 2,736,118 | 2/1956 | Clarkson et al. | 42—76 |
| 2,780,019 | 2/1957 | Sullivan | 42—76 |
| 2,792,657 | 5/1957 | Slowter | 42—76 |
| 2,850,828 | 9/1958 | Sullivan | 42—76 |
| 3,024,526 | 3/1962 | Phillipchuk | 29—470 |
| 3,025,765 | 3/1962 | Baker | 42—76 |

FOREIGN PATENTS

| | | |
|---|---|---|
| 743,111 | 1/1965 | Great Britain. |
| 37,033 | 5/1913 | Sweden. |
| 4,095 | 9/1891 | Switzerland. |

BENJAMIN A. BORCHELT, *Primary Examiner.*